Patented Aug. 31, 1954

2,687,964

UNITED STATES PATENT OFFICE 2,687,964

COMBINED INSECTICIDE AND POLISH

Raymond A. Kennedy, Sioux City, Iowa

No Drawing. Application November 7, 1951,
Serial No. 255,330

2 Claims. (Cl. 106—10)

This invention relates to a combination of insecticide with floor and for furniture polishes. It is well known that insects both of the flying and crawling type come into contact with the floor and furniture. An object of this invention, therefore, is to provide a finish which contains an insecticide in a sufficient proportion or amount as to be capable of killing insects upon contact.

Another object of this invention is to provide a composition wherein the insecticide will retain its effectiveness for a relatively long period of time.

Another object of this invention is to provide a composition wherein the polish forms the vehicle for the insecticide compound with the compound non-homogeneous relative to the vehicle.

A further object of this invention is to provide a composition which will have penetrative characteristics so as to be capable of penetrating crevices, cracks or the like in floors and furniture and remaining therein or on the surface for long periods of time.

A further object of this invention is to provide a composition which will remain non-homogeneous with respect to the vehicle or polish, and when dehydration or oxidation of the finish takes place, the insecticide compound will remain in effective position or exposure for contact by the insects.

In the preparation of the composition the following ingredients are initially mixed together in substantially the proportions indicated:

| | Parts |
|---|---|
| Chlordane concentrate | 5 |
| Whiting | 5 |
| Petroleum oil | 1 |

The above ingredients are mixed together by first dissolving the chlordane with the oil. The petroleum oil is preferably a pale paraffin oil. During the mixture of oil and chlordane the material is heated to about 120° F. for about three (3) minutes.

The mixture of oil and chlordane is then heated to about 140° F. and the whiting is then added and the mass mixed together by vigorous agitation for a period of about thirty (30) minutes. The vigorous mixing and agitation of the mass serves to effect impregnation of the oil and chlordane into the molecular structure of the whiting in addition to covering or coating each grain or particle of whiting with the oil and chlordane. The whiting constitutes the carrier for the oil and chlordane and serves as a means to maintain the insecticide compound non-homogeneous in the liquid finish or vehicle.

The mixture of oil, chlordane and whiting is then allowed to stand for about twenty-four (24) hours, after which this mixture is mixed with 89 parts of any conventional commercial grade of liquid floor wax of the type known as a self-polishing wax. The mixture of oil, chlordane and whiting with the liquid floor wax is done at room temperature and forms an emulsion, and the insecticide compound, that is, the mixture of oil, chlordane and whiting remains non-homogeneous in the liquid floor wax.

Another modified form of insecticide compound is produced as follows:

| | Parts |
|---|---|
| Chlordane | 5 |
| Water | 1 |
| Whiting | 5 |
| Liquid floor or furniture polish or floor glaze | 89 |

The liquid floor wax is formed of the following:

| | Parts |
|---|---|
| Hydromalin | 138 |
| Carnauba wax | 250 |

The composition which is formed of the insecticide compound and liquid floor wax or liquid polish is applied to the floor or furniture in the normal manner and after about 24 hours the dehydration or drying of the polish or finish will leave minute particles of the insecticide compound, that is, the coated and impregnated particles of whiting on the surface where they may be contacted by the insects. The effectiveness of the insecticide will last for a relatively long period, and it has been found from actual experiment that the effectiveness of the insecticide will not be destroyed by washing the floor or article. Under microscopic examination it has been observed that twenty-four (24) hours after applying the combination of the polish and insecticide compound about 60% of the surface was covered with the insecticide compound and the latter was exposed for contact by the insects.

What is claimed is:

1. In combination an insecticide compound and liquid polish formed of the following ingredients and proportions:

| | Parts |
|---|---|
| Chlordane concentrate | 5 |
| Petroleum oil | 1 |
| Whiting | 5 |
| Liquid wax | 89 |

2. An insecticide compound for incorporation in a liquid floor wax comprised of 5 parts chlordane concentrate and 1 part petroleum oil mixed with a carrier comprised of 5 parts whiting, the ratio of compound to floor wax being 11 parts of compound to 89 parts of liquid floor wax.

References Cited in the file of this patent

UNITED STATES PATENTS

| Number | Name | Date |
|---|---|---|
| 404,483 | Hastings | Jan. 4, 1889 |
| 2,295,132 | Sharp et al. | Sept. 8, 1942 |
| 2,534,008 | Fiero et al. | Dec. 12, 1950 |

FOREIGN PATENTS

| Number | Country | Date |
|---|---|---|
| 578,206 | Great Britain | June 19, 1946 |
| 108,087 | Australia | Aug. 3, 1939 |
| 10,405 | Australia | Oct. 30, 1928 |

OTHER REFERENCES

"DDT, The Tew Insecticide—A General Survey and Some Possible Paint Applications"—Paint Technology—December 1944—vol. IX—No. 108—page 263.

"Soap and Sanitary Chemicals" of February 1948, pages 138, 141, 171.